United States Patent Office.

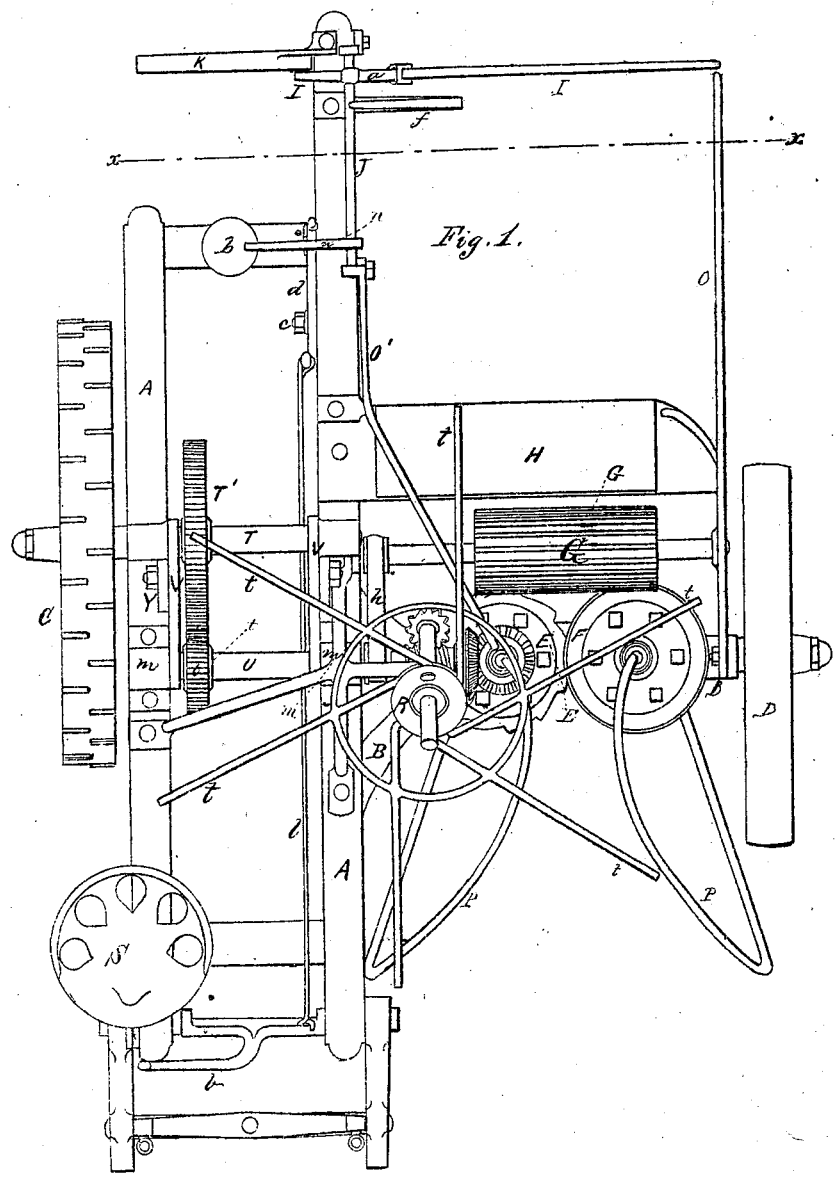

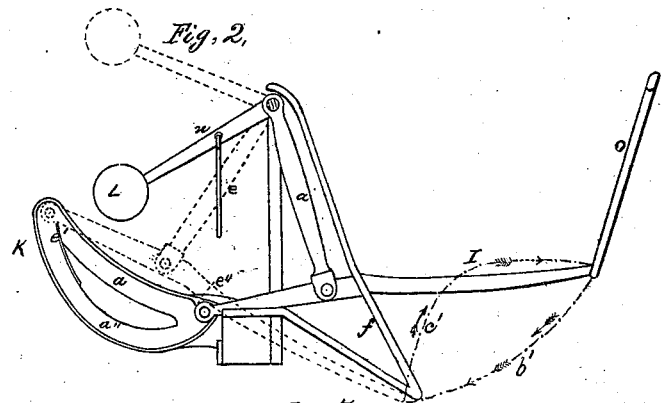

JAMES F. WINCHELL, OF SPRINGFIELD, OHIO, ASSIGNOR TO HIMSELF, L. A. SIMONS, AND G. C. STEELE.

Letters Patent No. 77,696, dated May 5, 1868.

---

IMPROVEMENT IN CORN-HARVESTERS.

---

The Schedule referred to in these Letters Patent and making part of the same.

---

TO ALL WHOM IT MAY CONCERN:

Be it known that I, JAMES F. WINCHELL, of Springfield, in the county of Clark, and State of Ohio, have invented certain new and useful Improvements in Corn and Cane-Harvesters; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

My invention consists in certain improvements in the construction of a machine for cutting standing corn, as hereinafter explained.

Figure 1 is a top plan view of my improved machine complete.

Figure 2 is a front elevation of the rear portion, taken on the line $x\ x$ of fig. 1.

Figure 3 is a longitudinal section of a portion detached, and taken on the line $z\ z$ of fig. 4; and Figure 4 is a side elevation of the devices for adjusting the height of the machine.

In constructing my improved machine, I make a frame, A, of any suitable size, on which is located the driving-mechanism, operated from a main wheel, C, which supports one side of the frame, the opposite side being supported on another wheel, D, secured to the outer end of an arm, B, as represented in fig. 1.

The cutting-mechanism consists of two rotary knives, one of which, E, is driven by bevelled gear from the end of a shaft, U, and has its edge serrated or notched, as represented; the other cutter, F, being mounted loosely on a journal, both cutters, E and F, being mounted on the arm B in the space between the inner side of the frame A and the wheel D.

Between the frame A and the cutter E is located a vertical reel, R, which may be driven by a worm-screw on the shaft U, as represented in fig. 1, or it may be operated by bevel-gear from teeth on the back face of the bevel-wheel $g$ on shaft U, the arms extending out far enough to draw the stalks up against the cutters.

Immediately in the rear of the cutters I locate a corrugated roller, G, which is driven by a belt, $h$, from the shaft U, and directly behind this roller I place a platform, H, as shown in fig. 1, to receive and support the butt-end of the stalks as they are cut, and carried over by the roller G and deposited thereon, the opposite end or central portion of the stalks falling on and being supported by a lever, I, which is suspended by and pivoted to an arm, $a$, rigidly attached to a rock-shaft, J, mounted longitudinally upon the rear portion of the frame A, as shown in fig. 1, there being a light frame of rods, O and O', at opposite sides, to direct the falling stalks, and hold them in place on the platform or rest H and lever I, as shown in fig. 1.

From the opposite side of the rock-shaft J extends an arm, $n$, to which is attached a counter-weight, L, which operates to throw the lever I forward, and hold it in position to receive the falling stalks as they are cut. This arm $n$ is connected by a rod, $e$, to an elbow-lever, $d$, pivoted by a bolt, $c$, to the inside bar of the frame A, the elbow-lever $d$ being connected by a rod, $l$, to a foot-lever, $b$, located at the front end of the frame A, in proper position to be operated by the foot of the driver, mounted on the seat S. By pressing on this lever $b$, the lever I is drawn back from under the stalks, thus permitting their rear ends to fall upon the ground, and as the machine continues to move forward, their butt-ends are drawn off from the platform or rest H, thus depositing the stalks on the ground in a bundle ready for binding or conveying away, as may be desired.

As soon as the foot is removed from the lever $b$, the weight L serves to force the lever I forward again into position for receiving the stalks as before. But experience has demonstrated that in doing this with a machine constructed according to my patent of October 9, 1866, the point of the lever I, as it was thrown back into position, would become entangled in the stalks, lifting some of them from the ground at their rear end, and, as the machine moved forward, with the butt of the stalks thus lifted, resting on the ground, the result was that said stalks would be raised to an upright position, and, coming into contact with the arms of the reel, be thrown over into the gearing of the machine.

Now, to obviate this difficulty, I extend the rear end of the lever I over the inside bar of the frame A, and provide it with a stud (carrying a friction-roller, if desired,) which moves in a groove, $a'$, of the cam K, as the lever I is drawn back, as shown in red in fig. 2. At the upper end of the groove $a'$ I locate a spring, $e'$, which permits the stud to pass it, but will not let it return along groove $a'$, but, instead, forces it to pass down the groove $a''$, by which means the point of the lever I is made to move along the dotted line $b'$ when drawn back, and along the line $c'$ when going back to its position.

It will thus be seen that the point of the lever I is lifted up and made to pass over and clear of the stalks on its return movement. By this means I entirely obviate the difficulty referred to.

In order to prevent the lever I from being accidentally or prematurely moved, I make a projection, $e''$, near the lower end of the groove $a'$, which prevents the lever I from moving until sufficient force is applied to carry the stud past this projection $e''$.

In order to adjust the machine so as to cut at any required height, I mount the axle T of the driving-wheel C in a couple of arms V, which have their opposite ends pivoted upon the inwardly-projecting ends of the boxes $m$, attached to the main frame A, and in which the shaft U is mounted. By this arrangement the main frame can be raised or lowered at pleasure, and the wheel $T'$ kept always in gear with the pinion $U'$, and at the same time relieve the shaft U from any friction from the arms V. A curved slotted bar, Y, is bolted to each of the bars of the main frame, in such a position that a stud or bolt, attached to the swinging arms V, will move in the slot of the bars Y, as shown in fig. 4, and, by means of a nut on these bolts, the arms V are clamped and held in position, when adjusted, as desired.

The reel consists of a central hub, with a series of arms, $t$, which project tangentially therefrom, and are bent downward the same being attached to a shaft, inclined forward, as represented in fig. 1. By this means the arms, as the reel revolves, draw the stalks directly backward, and at the same time tend to lift them up if bent or inclined forward, and thus bring them in proper position for the cutters to operate upon them to the best possible advantage.

The main driving-wheel C is secured loosely upon the shaft T, and has a pawl connecting it with a ratchet-hub, secured rigidly to the shaft, so as to permit the machine to be backed or turned without operating the mechanism, the latter being set in motion whenever the machine moves forward. This ratchet and pawl are fitted into a recess on the inner face of the hub of the wheel, so as to be entirely covered, and therefore protected from injury from dirt, weeds, &c.

The other wheel, D, is mounted on a short axle or spindle, which is secured by a nut in a slot made in the outer end of the arm B, which is turned upright for that purpose, whereby that side of the frame can be adjusted in height to correspond with the other.

Having thus described my invention, what I claim is—

1. The swinging lever or rest I, in combination with the cam K, or its equivalent, for imparting to it the movements, substantially as described.

2. The corrugated roller G, arranged in rear of the cutters, for delivering the stalks to the platform, substantially as set forth.

3. The combination of the roller G and the platform H, substantially as set forth.

4. Providing the groove $a'$ in the cam K with the projection $e''$, for holding the lever I in position, until operated by driver, as set forth.

5. I claim the combination of the lever I, connected by the arm $a$ to rock-shaft J, with the weighted arm $m$, or its equivalent, for automatically returning the lever to its position, substantially as set forth.

JAMES F. WINCHELL.

Witnesses:
W. C. DODGE,
H. B. MUNN.